United States Patent
Adcock et al.

[11] Patent Number: 6,104,443
[45] Date of Patent: Aug. 15, 2000

[54] SUSPENDED TELEVISION AND VIDEO MONITOR

[76] Inventors: David Adcock, 229 Winston St., Gadsden, Ala. 35901; Jack Ivan Jmaev, 10948 Manchester St., Alta Loma, Calif. 91701

[21] Appl. No.: 09/222,852

[22] Filed: Dec. 30, 1998

[51] Int. Cl.[7] .................................................. H04N 5/655
[52] U.S. Cl. .......................... 348/827; 358/903; 358/254; 248/411; 248/214; 248/371; 248/1; 248/188.7; 248/282; 312/209
[58] Field of Search .................................. 348/827, 552; 358/98, 181; 540/525

[56] References Cited

U.S. PATENT DOCUMENTS

| | | | |
|---|---|---|---|
| 4,248,213 | 2/1981 | Landre | 358/98 |
| 4,363,460 | 12/1982 | Carroll | 248/415 |
| 4,410,158 | 10/1983 | Maffei | 248/214 |
| 4,514,764 | 4/1985 | Borg et al. | 358/181 |
| 4,572,594 | 2/1986 | Schwartx | 312/209 |
| 4,607,897 | 8/1986 | Schwartz | 312/209 |
| 4,643,382 | 2/1987 | Ojima et al. | 248/371 |
| 4,672,703 | 6/1987 | Frazier | 5/503 |
| 4,706,920 | 11/1987 | Ojima et al. | 248/371 |
| 4,728,936 | 3/1988 | Guscott et al. | 340/525 |
| 5,160,852 | 11/1992 | Charles et al. | 307/77 |
| 5,177,616 | 1/1993 | Riday | 358/254 |
| 5,207,405 | 5/1993 | Cobb | 248/411 |
| 5,246,240 | 9/1993 | Romich et al. | 280/304.1 |
| 5,540,159 | 7/1996 | Anderson | 108/150 |
| 5,559,808 | 9/1996 | Kostreski et al. | 348/385 |
| 5,597,147 | 1/1997 | Hashi | 248/280 |

*Primary Examiner*—Andy Rao
*Assistant Examiner*—Shawn S. An
*Attorney, Agent, or Firm*—Jack I. J'Maev

[57] ABSTRACT

The present invention combines a small, compact, light-in-weight television receiver with a positioning mechanism that allows the television viewer to orient the television screen to suit her own comfort. The small size of the television receiver is intended to service only a few viewers at a time. Since the present invention utilizes a small, lightweight television receiver, a much more agile positioning mechanism can be employed.

The television receiver is supported in space by the articulation mechanism. The articulation mechanism can be attached to a wall, the headboard of a bed, to a piece of medical equipment, or to any other fixed object. An umbilical cable is drawn through the articulation mechanism and connects the television receiver to a power adapter. The power adapter accepts utility power from household convenience outlets and draws television signals from an antenna or a cable television outlet.

The television receiver can be oriented in any position and comprises a flat panel display assembly together with a television tuner and other electronics that enable control of channel selection, volume control, and video quality. The television receiver also accepts base-band video and senses finger touches on its screen. These facilities enable the television to operate as a video monitor with interactive menu capabilities.

13 Claims, 5 Drawing Sheets

SUSPENDED TELEVISION AND VIDEO MONITOR

BACKGROUND DESCRIPTION OF RELATED ART.

Ever since the introduction of television, television viewers have been frustrated by the lack of mobility afforded to television receivers. Television receivers have traditionally been large, bulky devices that could not be easily repositioned. This has forced the viewer to adapt her own physical position to conform to the viewing angle most appropriate to watching the programming on the television screen.

The need to adapt the viewers' physical position relative to the television screen can be at the very least annoying but on the other extreme physically uncomfortable. Not surprisingly, various mechanisms have been developed to allow the television viewer to articulate the position of the television to suit her own comfort. Unfortunately, each mechanism thus far discovered limits the overall mobility of the television. To be of any tangible benefit in this regard, the television receiver must be agile enough to be repositioned at a whim in any direction.

Perhaps the most physically uncomfortable position is the prone position assumed while laying in bed. A novel, but elaborate over-bed television support frame has been described by Maffei in U.S. Pat. No. 4,410,158. Maffei's prior art suspends a full-size television receiver above the bed so that the television viewer can watch programming while in a fully prone position.

The need to support and articulate a television set at bedside has spawned a wide variety of television stands. A television stand suitable for bedside attachment is described by Anderson in U.S. Pat. No. 5,540,159. Cobb, in U.S. Pat. No. 5,207,405, proffers yet another bed-side television stand.

Television receivers are also used to display data and images to doctors. In this capacity, the television receiver is referred to as a video monitor and is usually driven by computer generated video signals. Doctors confront a similar problem when performing surgery. The video monitor must be made more comfortable for the surgeon to view. In many circumstances, the surgeon must rely on the video images to guide his surgical activities; viewing comfort becomes critical to patient safety.

C. Bruce Schwartz describes in U.S. Pat. No. 4,607,897 a video endoscopic support stand. Schwarz' endoscopic support stand allows physicians to carry on their surgical duties more easily while watching a video image on a monitor. The support stand introduced by Schwartz allows the monitor to be positioned in almost any orientation relative to the doctor. This support stand clearly endeavors to conform the position of the video monitor to meet the comfort and viewing needs of the physician rather than the physician needing to contort his own person to view the image. Even as accommodating as this support stand appears to be, it still limits the vertical viewing angled of the television monitor. This support stand holds the face of the monitor orthogonal to the ground; a position that may not be suitable in all surgical circumstances. Finally, Schwarz' support stand has a limited range of motion and requires that the surgeon position himself proximate to the base upon which the stand is affixed. Similar safety and operating concerns apply to industrial displays where mechanical or electrical machinery. An operator must often control complex machinery based on feedback from a video monitor.

All of the prior art mechanisms simply fail to allow the user to fully manipulate the television receiver or video monitor. For instance, the television stand described by Ojima in U.S. Pat. No. 4,706,920 allows only the vertical angle of the screen to be adjusted. Some allow the television to be rotated laterally, but do not allow the television to tilt vertically. One apparatus suspends the television at a preferred height, but fails to allow vertical tilt. Most importantly, no prior art allows the television to the oriented freely in three dimensions. In order to meet the needs of the viewer, a television must be capable of easy reorientation in all three dimensions. In short, each prior art mechanism thus far described compromises one feature at the expense of another.

SUMMARY OF THE INVENTION

The present invention comprises a lightweight television receiver coupled to an articulating suspension member coupled to a base plate and connected to a power adapter. The television receiver comprises a housing that attaches to an articulating member and contains a flat panel display assembly, a tuner assembly, a button assembly, a microprocessor assembly, a graphics video overlay circuit, and a touch screen. An umbilical cable is fished through the hollow of the articulating member and connects the television receiver to the power adapter.

The present invention caters specifically to the needs of both casual television viewers that desire a television that can be oriented to suit their comfort and to industrial and medical systems that require video display monitors. The articulating suspension member enables the television receiver to the moved anywhere within its reach. The articulating suspension member may have an optional swivel that allows the television receiver to the tilted vertically to suit viewer comfort or to be rotated laterally to promote additional viewing comfort.

The power adapter accepts power from an external source and converts that power to low-voltage direct current that the television receiver requires. The power adapter also accepts radio-frequency (RF) television signals. Additionally, the power adapter accepts base-band video so that the television receiver can function as a video monitor. The power adapter includes a serial interface so that the entire apparatus can communicate with external data processing equipment. The power adapter consolidates the low-level direct current power together with the cables carrying the television RF feed, the base-band video and the serial interface into the umbilical cable.

The television receiver operates from the low-level DC power. The cable television signal is fed into a tuner assembly. The television receiver includes a microprocessor assembly that commands the tuner assembly to receive a particular television channel. The microprocessor assembly determines which channel to select based on menus presented to the user or by sensing when the channel selection switches on the front face of the television receivers are actuated.

The television receiver includes a touch sensitive matrix that senses finger touches on the display enabling interactive menus to be implemented by the microprocessor. When the television receiver is operating as a video monitor, the microprocessor communicates the finger touches to an external computer by way of a serial interface.

BRIEF DESCRIPTION OF THE DRAWINGS

These and other features, aspects, and advantages of the present invention will be apparent to those skilled in the art from the following detailed description, together with the accompanying drawings in which.

DETAILED DESCRIPTION OF THE INVENTION

Figure 1:
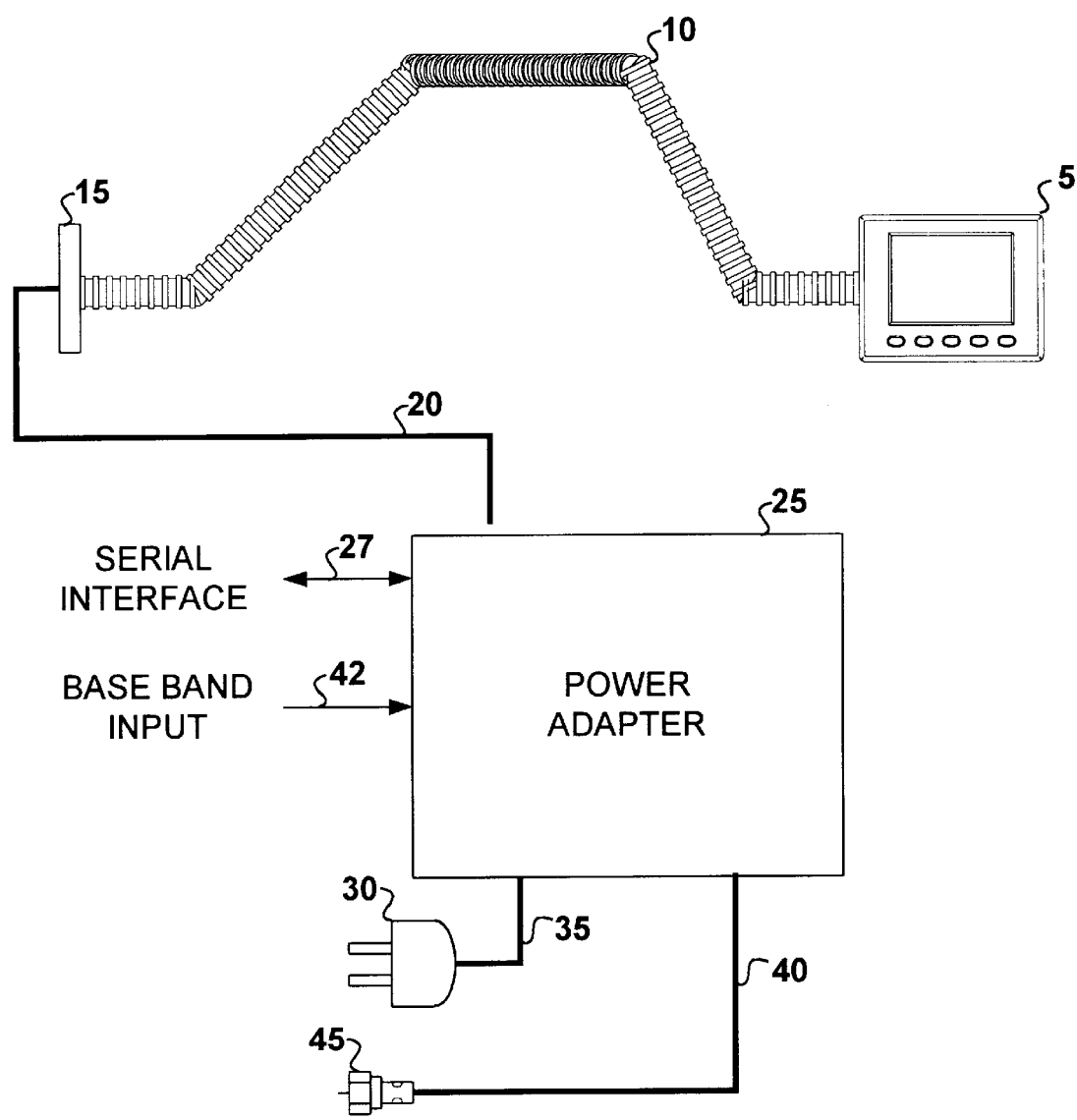
FIG. 1 is a pictorial view of the suspended television and video monitor incorporating a flexible conduit articulation mechanism.

Referring to FIG. 1, the preferred embodiment of the present invention comprises television receiver 5 that is coupled to flexible conduit gooseneck 10. Flexible conduit gooseneck 10 is attached to base plate 15. Umbilical cord 20 is connected to power adapter 25. The other end of umbilical cord 20 is fished through flexible conduit gooseneck 10 and connects to television receiver 5.

When the suspended television is installed, base-plate 15 is affixed to an immovable object so as to hold the base-plate fast. When base-plate 15 is immobilized in this fashion, flexible conduit gooseneck functions as an articulating suspension mechanism enabling television receiver 5 to be arbitrarily positioned in any orientation anywhere within the reach of the gooseneck.

Power plug 30 is connected to power cable 35. Power cable 35 is connected to power adapter 25. Radio-frequency connector 45 is connected to coaxial cable 40. Coaxial cable 40 is connected to power adapter 25.

Power plug 30 is used to receive input power from an external source such as a household convenience outlet. The power is carried to power adapter 25 by means of input power cable 35. It should be noted that the external power may be either alternating or direct current and can be of any voltage. Power adapter 25 converts input power into low-voltage direct-current power suitable to power the electronics contained within the television receiver.

Radio-frequency connector 45 is attached to a household cable television outlet or to a television aerial antenna. Coaxial cable 40 carries radio-frequency television signals to power adapter 25. Power adapter 25 includes serial interface 27. Serial interface 27 is a general-purpose computer interface that enables the present invention to communicate with an external computer or other device with a serial interface. Power adapter 25 includes base-band video interface 42. Base-band video interface 42 accepts video signals that are displayed by the television receiver.

Figure 2:
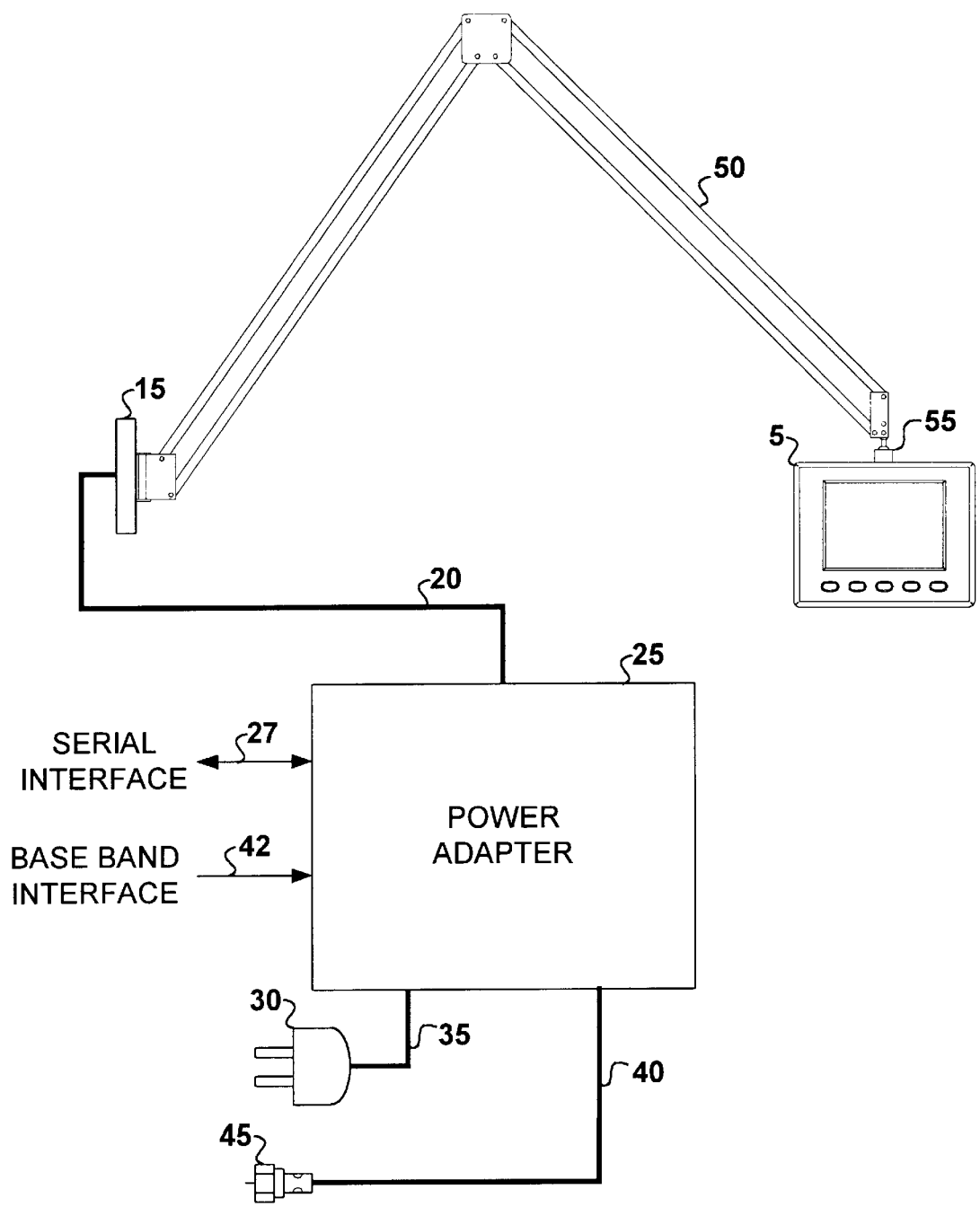
FIG. 2 is a pictorial view of the suspended television and video monitor incorporating a parallel scissor cantilever articulation mechanism.

FIG. 2 depicts an alternative embodiment of the present invention. In this alternative embodiment, television receiver 5 is coupled to ball-and-socket assembly 55. Ball-and-socket assembly 55 is attached to scissor gimbal 50. Scissor gimbal 50 is then attached to base-plate 15. Scissor gimbal 50, in conjunction with ball-and-socket assembly 55 allows the user to position the television receiver in any orientation within the reach of the gimbal. Power adapter 25, together with all of the interfaces described supra, interfaces to television receiver 5 in a manner analogous to that in the preferred embodiment presented in FIG. 1.

Figure 3:
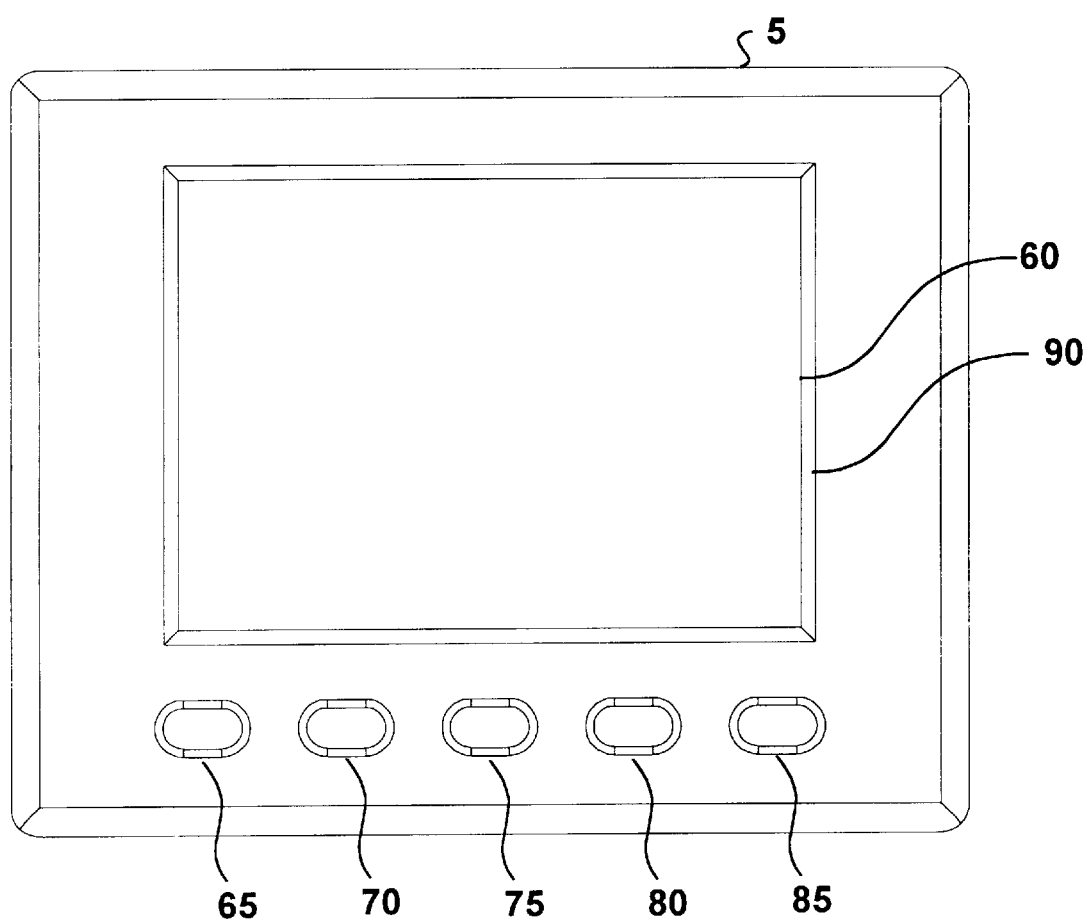
FIG. 3 depicts the front view of the television receiver housing.

FIG. 3 depicts the front panel of television receiver 5. The face of television receiver 5 comprises flat panel display 60, touch sensitive matrix 90 and five buttons (reference numbers 65 through 85 inclusive). Touch sensitive matrix 90 is used only when interactive graphical menu screens need to be displayed on flat panel display 60. The number of buttons here is illustrative of the function and the total number of buttons can be varied proportionally with the number of control capabilities desired for the television receiver. In fact, if all control of the television receiver were to be effected by means of touch sensitive matrix 90, all of the front panel buttons could be eliminated.

In the present embodiment, button 65 is used as an on-off switch. Buttons 70 and 75 are used to select channels. Buttons 80 and 85 are used to control volume. Touch sensitive matrix 90 senses the location of finger touches on flat panel display 60 to enable interactive menu capabilities.

Figure 4:
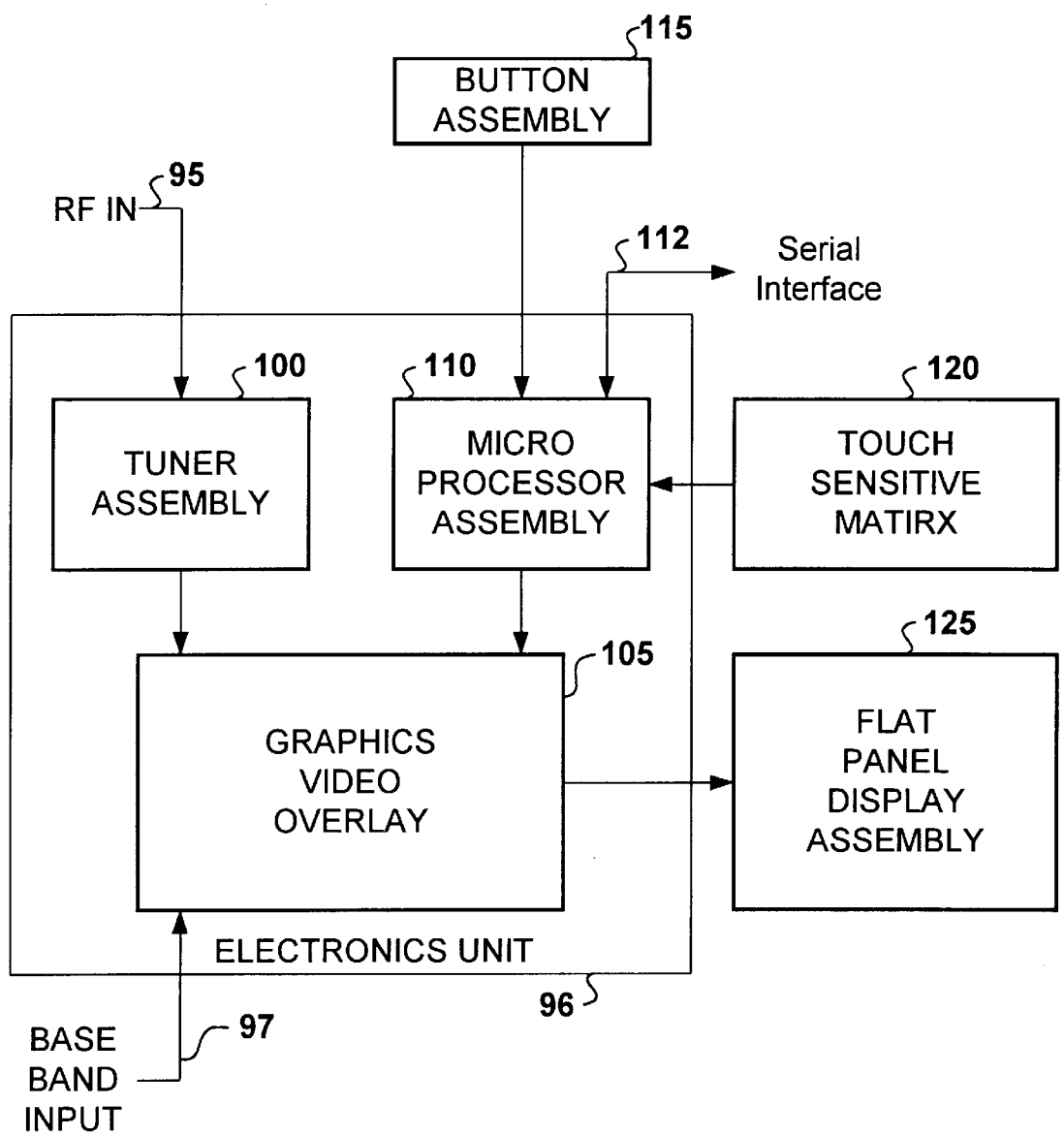
FIG. 4 presents a block diagram of the electronics contained within the television receiver.

Referring to FIG. 4, the internal makeup of television receiver 5 comprises electronics assembly 96 together with button assembly 115, touch sensitive matrix 120, and flat panel display assembly 125. Electronics assembly 96 comprises tuner assembly 100, graphics video overlay circuit 105, microprocessor assembly 110, By means of a cable interface, microprocessor assembly 110 continuously monitors button assembly 115 which comprises a circuit card and buttons 65 through 85, inclusive. When microprocessor assembly 110 detects a keystroke from button 65, the remaining electronic circuitry in television receiver 5 is enabled. When microprocessor assembly 110 detects a keystroke from button 75, indicating that the next higher channel should be selected, microprocessor assembly 110 sends a command to tuner assembly 100 causing it to tune to the next higher channel. When microprocessor Assembly 110 detects a keystroke from button 70, indicating that the next lower channel should be selected, microprocessor assembly 110 sends a command to tuner assembly 100 causing it to tune to the next lower channel.

Tuner assembly 100 responds to the tuning commands it receives from microprocessor assembly 110 by adjusting its tuner to receive the desired television channel. The desired television channel is received as a radio frequency (RF) signal carried by RF cable 95. RF cable 95 is embedded in the umbilical cord connecting television receiver 5 to power adapter 25. Tuner assembly 100 recovers video and audio signals from the RF carrier. The video signal is routed to the graphics video overlay circuit 105. When the television is used is a video monitor, base-band video signals are accepted over video cable 97. In this case, the base-band video signal is routed directly to graphics video overlay circuit 105.

As microprocessor assembly 110 sends commands to tuner assembly 100, it also sends graphical text to graphics video overlay circuit 105 representative of the newly selected television channel. Graphics video overlay circuit 105 superimposes the graphical text it receives from microprocessor assembly 110 onto the video signal it receives from tuner assembly 100. This combined video signal is then routed to flat panel display 125.

Flat panel display 125 receives video signals from graphics overlay circuit 105 and creates a visual image suitable for presentation to a human user.

Touch sensitive matrix 120 senses when a user touches the surface of flat panel display 125 with a finger or stylus like object. Touch sensitive matrix 120 reports these "finger touches" together with the location and duration of the event. These finger touch reports are presented to microprocessor assembly 110. Microprocessor assembly 110 uses these reports to enable the display of interactive menus on flat panel display 125. In the current embodiment, touching flat panel display 125 causes microprocessor assembly 110 to display a 10-key pad. The user can use the 10-key pad to enter a channel directly; saving her the bother of scanning through each channel sequentially using buttons 70 and 75 on the front panel of television receiver 5. When television receiver 5 is operating as a video monitor, microprocessor assembly 110 reports finger touches, including location and duration, to an external computer by means of serial interface 112.

Figure 5:
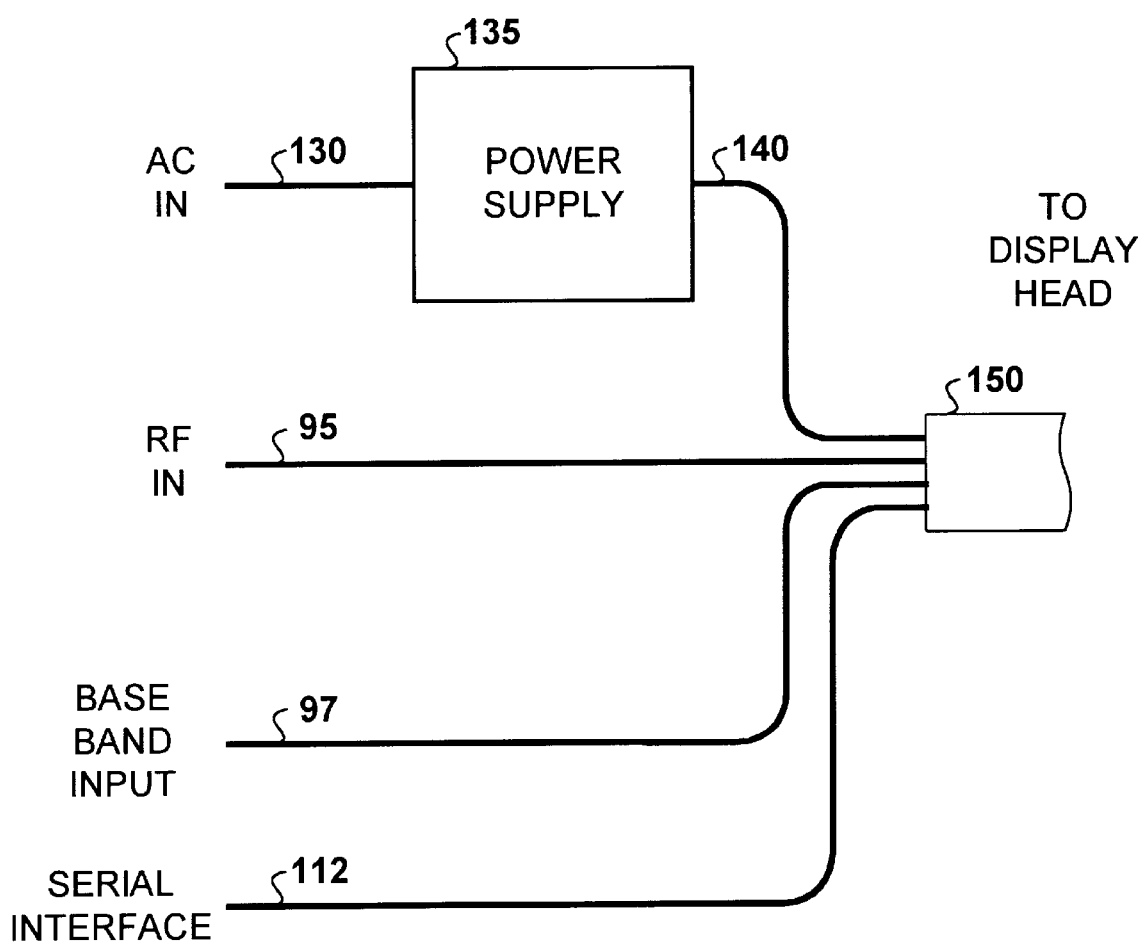
FIG. 5 depicts the internal makeup of the power adapter.

Referring to FIG. 5, power adapter 25 comprises power supply 135 together with input power cable 130, RF cable 95, video cable 97 and serial interface cable 112. Power supply 135 converts the input power to the voltage levels required by television receiver 5. These output voltages are carried to television receiver 5 by means of cable 140. Cables 95 (carrying RF), 97 (carrying base-band video), 112 (carrying serial interface signals) and cable 140 (carrying the power supply output) are collected into a single sheath to form umbilical cable 150. Umbilical cable 150 is fished through the hollow of the articulating member, either the flexible gooseneck 10 or the scissor gimbal 50.

We claim:

1. A suspended video unit for displaying video images comprising a base-plate, a video display, and an articulating mechanism consisting of either a flexible gooseneck conduit or a scissor gimbal wherein the articulating mechanism is coupled to the base-plate at one end and coupled to the video display at the other end for suspending the video display in an arbitrary position and orientation.

2. The suspended video unit of claim 1 wherein the video display receives power from a remote power adapter.

3. The suspended video unit of claim 1 wherein the video display comprises a television receiver that receives a plurality of radio-frequency television channels.

4. The suspended video unit of claim 3 wherein the television receiver receives the radio-frequency television channels by means of an umbilical cable that also carries electrical power to the television receiver.

5. The suspended video unit of claim 1 wherein the video display comprises a video monitor that receives a base-band video signal.

6. The suspended video unit of claim 5 wherein the video monitor receives the base-band video signal by means of an umbilical cable that also carries electrical power to the video monitor.

7. The suspended video unit of claim 1 wherein the video display comprises a flat panel display and that receives video information from an electronics assembly connected thereto.

8. The suspended video unit of claim 7 wherein the electronics assembly comprises a radio frequency tuner whereby specific channels of the frequency spectrum are selected and the video information therein is demodulated and presented to a graphics overlay circuit, a microprocessor assembly whereby the radio frequency tuner is steered to select a particular channel and whereby digital information indicative of the selected channel is created, and a graphics video overlay circuit whereby the digital information indicative of the selected channel is combined with the video information demodulated by the radio frequency tuner.

9. The suspended video unit of claim 8 wherein the electronics assembly is connected to a touch sensitive matrix that is mounted proximate to the surface of the video display's screen so as to sense application of a touch and the position thereof on the video display's screen.

10. The suspended video unit of claim 8 wherein the electronics assembly is electrically coupled to a button assembly whereby actuation of the buttons is sensed by the microprocessor assembly.

11. The suspended video unit of claim 1 wherein the articulating mechanism is pivotally coupled to the base-plate.

12. The suspended video unit of claim 1 wherein the articulating mechanism is pivotally coupled to the video display.

13. The suspended video unit of claim 1 wherein the articulating mechanism is pivotally coupled to the base-plate and pivotally coupled to the video display.

* * * * *